(12) United States Patent
Wang

(10) Patent No.: US 11,341,922 B2
(45) Date of Patent: May 24, 2022

(54) ELECTRONIC DEVICE HAVING ONE OR MORE OPTICAL DEVICES UNDER A DISPLAY SCREEN

(71) Applicant: HUAWEI TECHNOLOGIES CO., LTD., Guangdong (CN)

(72) Inventor: Xilin Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/146,769

(22) Filed: Jan. 12, 2021

(65) Prior Publication Data

US 2021/0134228 A1 May 6, 2021

Related U.S. Application Data

(63) Continuation of application No. PCT/CN2019/095852, filed on Jul. 12, 2019.

(30) Foreign Application Priority Data

Jul. 13, 2018 (CN) .......................... 201810771823.2
Nov. 29, 2018 (CN) .......................... 201811446374.0

(51) Int. Cl.
*G09G 3/3266* (2016.01)
*G09G 3/3216* (2016.01)
(Continued)

(52) U.S. Cl.
CPC ......... *G09G 3/3266* (2013.01); *G09G 3/3216* (2013.01); *G09G 3/3225* (2013.01); *H04N 5/2257* (2013.01); *G09G 2300/0809* (2013.01)

(58) Field of Classification Search
CPC .................................................... G09G 3/3266
(Continued)

(56) References Cited

U.S. PATENT DOCUMENTS

2007/0200812 A1  8/2007  Maede et al.
2007/0268221 A1  11/2007  Sakurai
(Continued)

FOREIGN PATENT DOCUMENTS

CN  101577083 A  11/2009
CN  101594402 A  12/2009
(Continued)

*Primary Examiner* — Long D Pham
(74) *Attorney, Agent, or Firm* — Womble Bond Dickinson (US) LLP

(57) ABSTRACT

A display screen module is applied to an electronic device, and includes a first display array, one or more second display arrays, and a control circuit. The electronic device includes one or more groups of optical devices, and each group includes at least one optical device. The display arrays one-to-one correspond to the optical devices, and each second display array is located above a group of optical devices corresponding to the second display array. The control circuit is configured to control each second display array to display an image when none of optical devices in a group of optical devices corresponding to the second display array works. The control circuit is further configured to: when one or more optical devices in a group of target optical devices need to work, turn off some or all pixels of a target second display array corresponding to the group of target optical devices.

18 Claims, 10 Drawing Sheets

(51) Int. Cl.
*G09G 3/3225* (2016.01)
*H04N 5/225* (2006.01)

(58) Field of Classification Search
USPC .......................................................... 345/204
See application file for complete search history.

(56) References Cited

U.S. PATENT DOCUMENTS

| | | | | |
|---|---|---|---|---|
| 2016/0343787 A1* | 11/2016 | Wu | ............... | G02F 1/13336 |
| 2017/0124933 A1* | 5/2017 | Evans, V | ............... | G06F 1/1686 |
| 2017/0132970 A1 | 5/2017 | Tang | | |
| 2018/0040679 A1* | 2/2018 | Hong | ............... | G09G 3/3648 |

FOREIGN PATENT DOCUMENTS

| | | |
|---|---|---|
| CN | 104900676 A | 9/2015 |
| CN | 107346152 A | 11/2017 |
| CN | 107784989 A | 3/2018 |
| CN | 108259677 A | 7/2018 |
| CN | 108269839 A | 7/2018 |
| CN | 207781599 U | 8/2018 |
| JP | 2007104686 A | 4/2007 |
| JP | 2017130201 A | 7/2017 |

\* cited by examiner

ELECTRONIC DEVICE HAVING ONE OR MORE OPTICAL DEVICES UNDER A DISPLAY SCREEN

CROSS-REFERENCE TO RELATED APPLICATIONS

This application is a continuation of International Application No. PCT/CN2019/095852, filed on Jul. 12, 2019, which claims priority to Chinese Patent Application No. 201811446374.0, filed on Nov. 29, 2018 and Chinese Patent Application No. 201810771823.2, filed on Jul. 13, 2018. The disclosures of the aforementioned applications are hereby incorporated by reference in their entireties.

TECHNICAL FIELD

The present disclosure relates to terminal technologies, and specifically, to a display screen module and an electronic device.

BACKGROUND

With the development of smartphones, bezel-less phones with a higher screen-to-body ratio have become a trend in the industry. Space occupied by components such as a front-facing camera, an ambient light sensor, a distance sensor, and an earpiece on a front surface of a conventional mobile phone needs to be minimized, and a screen area needs to be enlarged, to increase a screen-to-body ratio. Currently, all manufacturers are trying to hide these components to achieve a higher screen-to-body ratio while still keeping original functions. Among these components, components such as the ambient light sensor, the distance sensor, and the earpiece may be easily placed under a screen and can be hidden. However, the front-facing camera needs more incident light to perform clear imaging, and light transmittance of a current mainstream screen (such as an AMOLED or an LCD) cannot meet a requirement of the front-facing camera. Therefore, if the front-facing camera is placed under the screen, imaging quality is affected.

In the prior art, some manufacturers use a solution in which gaps are left at the top of the screen for various sensors, namely, a "notch" solution. On the screen, a gap corresponding to a camera is left as a window for the camera. The screen-to-body ratio is increased by using such an irregular screen. This solution damages integrity of the screen, affects display of user interface content at the gap, and cannot implement a bezel-less screen with a higher screen-to-body ratio.

SUMMARY

According to a first aspect, this application provides a display screen module, applied to an electronic device. The electronic device includes one or more groups of optical devices, each group of optical devices includes at least one optical device, and the optical device is a device that needs ambient light during normal working. The display screen module includes a first display array, one or more second display arrays, and a control circuit. The one or more second display arrays one-to-one correspond to the one or more groups of optical devices, and each second display array is located above a group of optical devices corresponding to the second display array. The control circuit is configured to control each second display array to display an image when none of optical devices in a group of optical devices corresponding to the second display array works. The control circuit is further configured to: when a target optical device in a group of target optical devices needs to work, turn off some or all pixels of a target second display array corresponding to the group of target optical devices, so that the ambient light can penetrate the target second display array and enable the target optical device to work normally, where the group of target optical devices is one of the one or more groups of optical devices, and the target second display array is one of the one or more second display arrays.

In an embodiment, the optical device is located under the second display array. In this way, when the optical device does not work, a position of the optical device may be used to display the second display array. This can increase a display area and improve a screen-to-body ratio. In addition, in this embodiment, the second display array is turned off when the optical device works. In this way, the ambient light can penetrate the one or more second display arrays, and enable the optical device to work normally. This can improve a screen-to-body ratio and user experience while ensuring normal working of the optical device.

In an embodiment, the first display array is an active-matrix organic light-emitting diode (AMOLED) array, and the one or more second display arrays are one or more passive-matrix organic light-emitting diode (PMOLED) arrays. Certainly, the first display array may alternatively be a MicroLED display array or the like.

The AMOLED array has a good display effect and may be used as a main display part. The PMOLED array has good light transmittance. The AMOLED array and the PMOLED array cooperate with each other. This can not only ensure a main display effect, and but also allow the optical device such as a front-facing camera to be placed under a screen. This improves a screen-to-body ratio and user experience while ensuring normal working of the optical device.

In another embodiment, the control circuit includes a driver circuit, a plurality of data pins, an AMOLED row gating circuit, a PMOLED row gating circuit, and a row control circuit. The plurality of data pins are connected to the AMOLED array, and some data pins in the plurality of data pins are also connected to the PMOLED array. The driver circuit is configured to drive the AMOLED array by using the plurality of data pins and drive the one or more PMOLED arrays by using the some data pins. The row control circuit is configured to control the AMOLED row gating circuit and the PMOLED row gating circuit. The AMOLED row gating circuit is configured to gate a row of the AMOLED array under control of the row control circuit. The PMOLED row gating circuit is configured to gate a row of the one or more PMOLED arrays under the control of the row control circuit.

The data pins are shared. This can minimize costs and a volume when a driver IC chip for the AM array is redesigned or a new driver IC chip is designed for the PM array.

In another embodiment, the one or more PMOLED display arrays have an equal quantity of rows, and the one or more PMOLED display arrays share a row line.

In this way, rows of all the PM arrays can be gated by using only one row gating signal. This can reduce design complexity and design costs.

In another embodiment, the display screen module further includes a plurality of PMOLED drives, where each of the plurality of PMOLED drives is connected to one data pin in the some data pins and one column in the one or more PMOLED arrays; and when being configured to drive the one or more PMOLED arrays by using the some data pins, the driver circuit is configured to drive the one or more PMOLED arrays by using the some data pins and the PMOLED drives.

A drive is added to meet a requirement of the PMOLED for a large current. In this way, the driver circuit does not need to be changed, and an existing AMOLED driver circuit can still be used. This can reduce design costs and hardware costs.

In another embodiment, the row control circuit includes a row control signal generator and a frequency divider, the row control signal generator is connected to one end of the frequency divider, and the other end of the frequency divider is connected to the PMOLED row gating circuit. The row control signal generator is configured to output a clock signal to control the AMOLED row gating circuit. The frequency divider is configured to perform frequency division on the clock signal output by the row control signal generator, to obtain a frequency-divided clock signal. The AMOLED row gating circuit is configured to gate the row of the AMOLED array under control of the clock signal. The PMOLED row gating circuit is configured to gate the row of the one or more PMOLED arrays under control of the frequency-divided clock signal.

The frequency divider can simultaneously output two clock signals for control. In this way, the two arrays can be scanned.

In another embodiment, the one or more PMOLED arrays have M rows, the AMOLED array has N rows, and a frequency division coefficient of the frequency divider is obtained by rounding N/M and then adding 1, where both N and M are integers greater than 2, and N is greater than M.

Based on the frequency division coefficient configured in the foregoing manner, the two arrays can be scanned based on a specific scanning ratio. This can be easily implemented and reduces implementation costs.

In another embodiment, the AMOLED row gating circuit includes an AMOLED gate of array GOA, and the AMOLED gate of array includes a plurality of output pins. An output pin corresponding to a PMOLED row gating clock cycle is set as a dummy pin that is not connected to the row of the AMOLED array.

After the dummy pin is set, output of the AMOLED gate of array does not affect row gating of the AMOLED array. This can prevent data from being output to the AMOLED array when being output to the PMOLED, and ensure accuracy of displayed content.

In another embodiment, each PMOLED row gating circuit includes a PMOLED gate of array GOA, and the PMOLED gate of array includes a plurality of output pins. The AMOLED gate of array and one or more PMOLED gates of array include one or more dummy pins used for padding, so that a quantity of pins of the AMOLED gate of array is [N/M] times a quantity of pins of the PMOLED gate of array, where [ ] indicates a rounding operation. [N/M] may be rounded up or rounded down. The dummy pin may be added only to the AMOLED GOA, or may be added to both the AMOLED GOA and the PMOLED GOA. Specific implementation is not limited, provided that N/M is an integer. For a specific implementation, refer to examples in FIG. 8 and FIG. 9.

A quantity of rows of a gate on array is supplemented. In this way, the two gates of array output gating signals according to a specific rule (for example, first output signals from several pins of the AMOLED gate of array, and then output a signal from a pin of the PMOLED gate of array). This facilitates implementation and reduces design costs.

In another embodiment, the PMOLED row gating circuit includes the PMOLED gate of array and a plurality of backflow transistors, and each backflow transistor is configured to connect to one output pin of the PMOLED gate of array and one row line of the one or more PMOLED arrays. The PMOLED gate of array is configured to output a PMOLED row gating signal under the control of the frequency-divided clock signal. A backflow transistor connected to a gated row is configured to gate the gated row under control of the PMOLED row gating signal.

The backflow transistor may be disposed to cooperate with the gate of array to complete row gating. For example, when a driving capability of the gate of array is insufficient, the backflow transistor provides a specific driving capability to implement a backflow circuit.

In another embodiment, the backflow transistor may be based on a MOS transistor. A gate of the MOS transistor may be connected to an output pin of a GOA, a drain of the MOS transistor is connected to a cathode of a PM pixel, and a source of the MOS transistor is grounded. This solution can be easily implemented, and reduce costs.

In another embodiment, the optical device is located at the top of the electronic device in which the display screen module is located. An optical device is usually placed at the top of an electronic device (for example, a mobile phone). This can fit a user's use habit, and improve user experience.

In another embodiment, the control circuit is further configured to: when a predefined application interface is displayed, turn off a display region including all the PMOLED arrays, so that a remaining display region is a complete rectangular display region. A specific size of the display region that is turned off may depend on an actual situation (for example, both the PMOLED array and some pixels in the AMOLED array may be turned off), provided that the remaining display region is the complete rectangular display region.

In this manner, a displayed region may look more complete, and there is no display effect such as "notch" or "water droplet". This improves user experience, and prevents light-emitting pixels near the optical device from causing interference to normal working of the optical device.

In another embodiment, content that has a relatively high requirement for a display effect is displayed by the AMOLED array, and content that has a relatively low requirement for the display effect is displayed by the PMOLED array.

According to a second aspect, an embodiment of the present application discloses an electronic device, including the display screen module according to any one of the first aspect or the implementations of the first aspect, a processor, and a memory. The processor is connected to the display screen module and the memory, and the processor is configured to control, by reading and executing a program instruction stored in the memory, the display screen module to display content.

According to a third aspect, an embodiment of the present disclosure discloses a display module control chip, including the control circuit disclosed in any one of the first aspect or the implementations of the first aspect. In another implementation, the chip may further include the plurality of drives disclosed in the implementations of the first aspect.

BRIEF DESCRIPTION OF DRAWINGS

To describe the technical solutions in the embodiments of the present disclosure more clearly, the following briefly describes the accompanying drawings for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following describes the embodiments of the present disclosure with reference to accompanying drawings. To better understand the solutions of this application, the following first describes an application background of the solutions of this application.

A display screen module in this application may be applied to various electronic devices, and is used as a display screen of the electronic devices. The electronic devices include but are not limited to various terminal devices (such as a mobile phone and a tablet computer) and other devices that require a screen (such as a personal computer). The display screen module herein mainly includes a display screen configured for display, and a control circuit configured to control the display screen to perform display.

Figure 1:
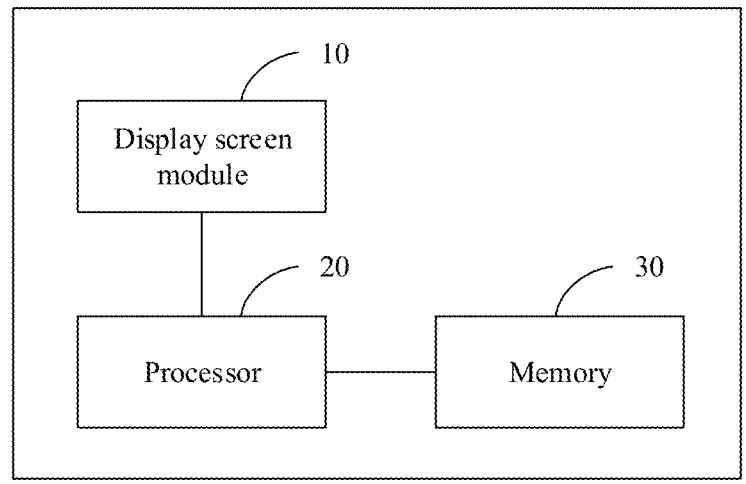
FIG. 1 is a schematic structural diagram of an electronic device.

Referring to FIG. 1, an electronic device mainly includes a processor 20, a memory 30, and a display screen module 10 in this application. The processor 20 is configured to connect to the display screen module 10 and the memory 30. The processor 20 is configured to: cooperate with the memory (for example, read an instruction stored in the memory, and store volatile and non-volatile data into the memory in a running process) to perform a corresponding function, and output, to the display screen module, data that needs to be displayed. In this application, the processor is a circuit having a processing capability or a combination of a plurality of circuits having a processing capability. The processor is usually packaged as a chip, or may be a discrete component. This is not limited. The processor may be a software-based processor (for example, a CPU), a hardware-based processor (for example, an ASIC-based processor or an FPGA-based processor), or a combination thereof. A typical processor may be a processor that is widely applied to terminal devices, for example, a Huawei Kirin processor or a Qualcomm Snapdragon processor.

The display screen module 10 may be connected to the processor by using an existing interface (for example, a mobile industry processor interface Mobile Industry Processor Interface). The display screen module 10 is configured to display, on a display screen under control of the processor and based on data output by the processor, content that needs to be displayed.

In this application, the memory is a device that can store data, and may include one or more storage chips, where the storage chip may be volatile or non-volatile. For example, the memory may include a memory chip (usually referred to as a "DDR chip") used as a volatile storage medium, may include a flash chip used as a non-volatile storage medium, or may include another storage medium such as a hard disk, a magnetic tape, or a compact disc. This is not limited in this application. The memory is configured to store various types of data, including temporary data and non-temporary data. The temporary data (for example, data in a running process of a software program) may be stored into the memory chip, and the non-temporary data may be stored into the non-volatile storage medium (for example, the flash chip).

Based on the foregoing description about the application background, the following describes in detail the embodiments of this application.

Embodiment 1

Figure 2:
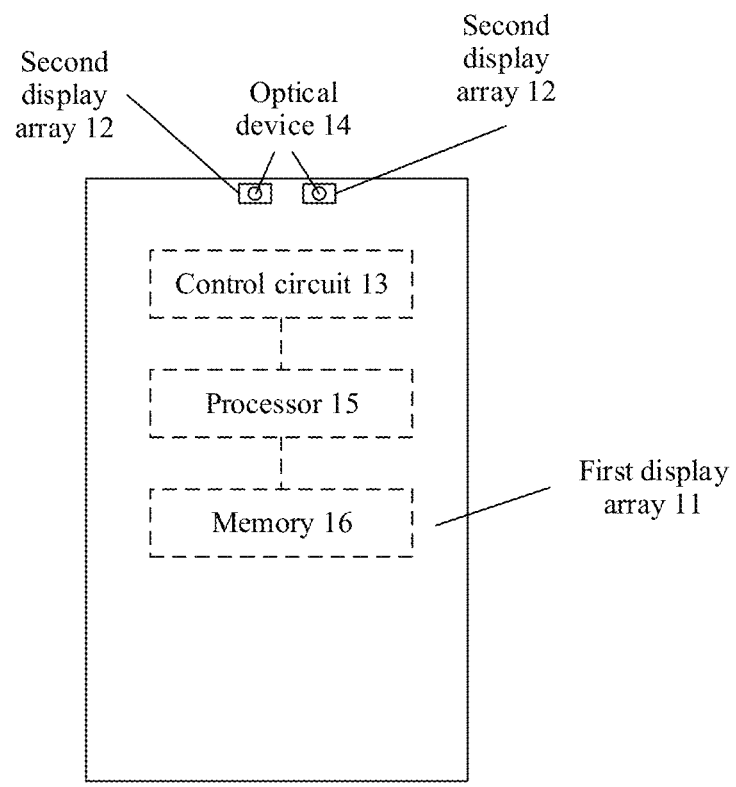
FIG. 2 is a schematic structural diagram of an electronic device according to an embodiment.
Figure 3:
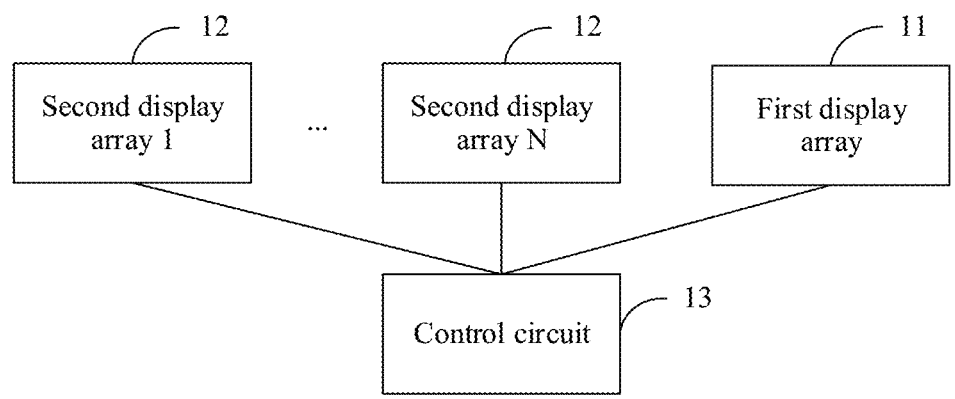
FIG. 3 is also a schematic structural diagram of an electronic device according to an embodiment.

Referring to FIG. 2 and FIG. 3, this embodiment discloses a display screen module. The display screen module may be applied to the electronic devices described above. The display screen module includes a first display array 11, one or more second display arrays 12, and a control circuit 13.

In an embodiment, one or more groups of optical devices 14 are included and are located under the one or more second display arrays (in other words, the optical devices are under a display screen, of an electronic device, as usually seen), and each group of optical devices includes at least one optical device. The optical device is a component that needs ambient light during working. For example, a group of optical devices may include only a front-facing camera, or may include both a front-facing camera and another sensor such as an ambient light sensor or a proximity sensor that needs the ambient light during working.

In an embodiment, a basic unit of a display array is a pixel (for example, a light emitting diode) used for display. The display array is an array obtained by permuting and combining display pixels. When these arrays need to be displayed, display pixels in a row are first gated, and then column data is output to light up the pixels that need to be displayed. This process is usually referred to as "scanning". The "gating" is to apply a signal to a pixel to make the pixel enter a state. In this state, when data (a driving signal) is input to the pixel, the pixel is lit up. A permutation and combination manner of the display arrays is not limited. To make the screen more beautiful, the display arrays may be permuted and combined into a rectangular screen that is the same as that in the prior art, or certainly, may be permuted and combined into another shape (such as a circle, a trapezoid, or a shape of an object) based on design requirements.

A display screen material (for example, an AMOLED) with a good display effect may be selected for the first display array, and a major large area is occupied by the first display array. Light transmittance of the second display array needs to meet a requirement of the optical device. To be specific, the second display array is a display array whose light transmittance achieved when the display array is turned off (that is, pixels in the display array do not emit light) can enable the optical device to work normally. An area occupied by the second display array may be relatively small (the second display array is mainly disposed above the optical device). Specific positions of the first display array and the second display array are not limited. For example, the second display array (one or more) may be surrounded by the first display array, provided that a screen shape meeting the design requirements can be finally formed.

In an embodiment, the optical device includes but is not limited to a component that needs light, such as the front-facing camera, a proximity sensor, or an infrared sensor. Placing the optical device under the display array allows more space for the display array. In this way, more content can be displayed, and a screen-to-body ratio of the electronic device is higher. In specific implementation, a size of the second display array may be determined based on an amount of light required by the optical device. If the optical device requires a relatively large amount of light, the size of the second display array may be increased; and otherwise, the size of the second display array may be decreased. For example, a size of a single second display array is usually set to be greater than a size of a lens of the front-facing camera. In addition, it may be understood that a quantity of second display arrays may be determined based on a quantity of optical devices. Each display array may correspond to one optical device. In other words, each display array may be located above one optical device corresponding to the display array. Certainly, one display array may correspond to a plurality of optical devices, or a plurality of display arrays may correspond to one optical device. This is not limited. Usually, the display array and the optical device are in relatively regular geometric shapes. Therefore, when each display array is being placed, a central position of each display array may be aligned with a central position of the optical device. Certainly, a specific error may be allowed, provided that a maximum amount of light can penetrate the display array, to better meet a requirement of the optical device for light.

In an embodiment, that the optical device normally works means that the optical device can work based on a design requirement. A specific design requirement (for example, some parameters and indicators that need to be achieved) may be determined based on a specific product and actual application.

In an embodiment, the control circuit is configured to control each second display array to display an image when none of optical devices in a group of optical devices corresponding to the second display array works. In this case, both the first display array and the second display array can display an image normally. In this way, a user can see more content and have better user experience.

In an embodiment, the control circuit is further configured to: when a target optical device in a group of target optical devices needs to work, turn off some or all pixels of a target second display array corresponding to the group of target optical devices, so that the ambient light can penetrate the target second display array and enable the target optical device to work normally, where the group of target optical devices is one of the one or more groups of optical devices, and the target second display array is one of the one or more second display arrays. In this application, there may be one or more target optical devices. In addition, it may be understood that a quantity of target optical devices is less than or equal to a total quantity of target optical devices in the group of target optical devices.

When the optical device works, the ambient light can penetrate the second display array, and is used to provide light required for normal working of the optical device. In this way, the optical device can still work normally when a high screen-to-body ratio is achieved, and this improves user experience.

In an embodiment, the control circuit is configured to control the first display array and the second display array under control of a processor. To be specific, the control circuit first receives a control signal (for example, which data needs to be output) of the processor, and then controls the first display array and the second display array. These control manners are control manners used in the prior art, and are not described in detail in this application.

It may be understood that, restricted by a technical level and a process, the ambient light still suffers a specific loss after penetrating a second display array whose pixels are turned off. A person skilled in the art may select a proper type of second display array based on a design requirement of specific application, to meet the design requirement of the specific application even if there is a loss. For example, if a photographing quality requirement of the front-facing camera can be met when the light transmittance reaches at least 70%, a display array whose light transmittance is greater than or equal to 70% may be selected.

In another embodiment, the second display array may be a PMOLED (Passive Matrix Organic LED) array. When the array does not work (in other words, none of pixels is displayed), light transmittance may reach at least 80%, and this can meet working requirements of most optical devices (including the front-facing camera). In another embodiment, the first display array may be any existing display array, for example, an LCD (liquid crystal display) array, a MicroLED (micro-light emitting diode) array, or an AMOLED (active matrix organic light emitting diode) array.

In a specific application scenario, the optical device is located at the top of the electronic device. Because the optical device is located at the top of the electronic device, correspondingly the second display array is also located at the top of the electronic device. It may be understood that the "top" means an upper part of the electronic device when the user normally holds the electronic device, that is, a position at which a front-facing camera and an earpiece are placed in an existing electronic device (for example, a mobile phone). A specific position indicated by the "top" may be determined based on a design requirement, and is not described in this application. For details, refer to the prior art. Existing optical devices are usually placed at the top of an electronic device. This can fit a design of an existing optical device, comply with a user's use habit, and improve user experience.

In an embodiment, software may be further used to implement more natural display and achieve a better display effect. For example, on some application interfaces, some AMOLED (AM for short in this application) pixels and some or all PMOLED (PM for short in this application) pixels may be turned off, to form an entire display pattern. The entire display pattern may include only first display arrays (for example, AMOLED arrays).

Figure 4:
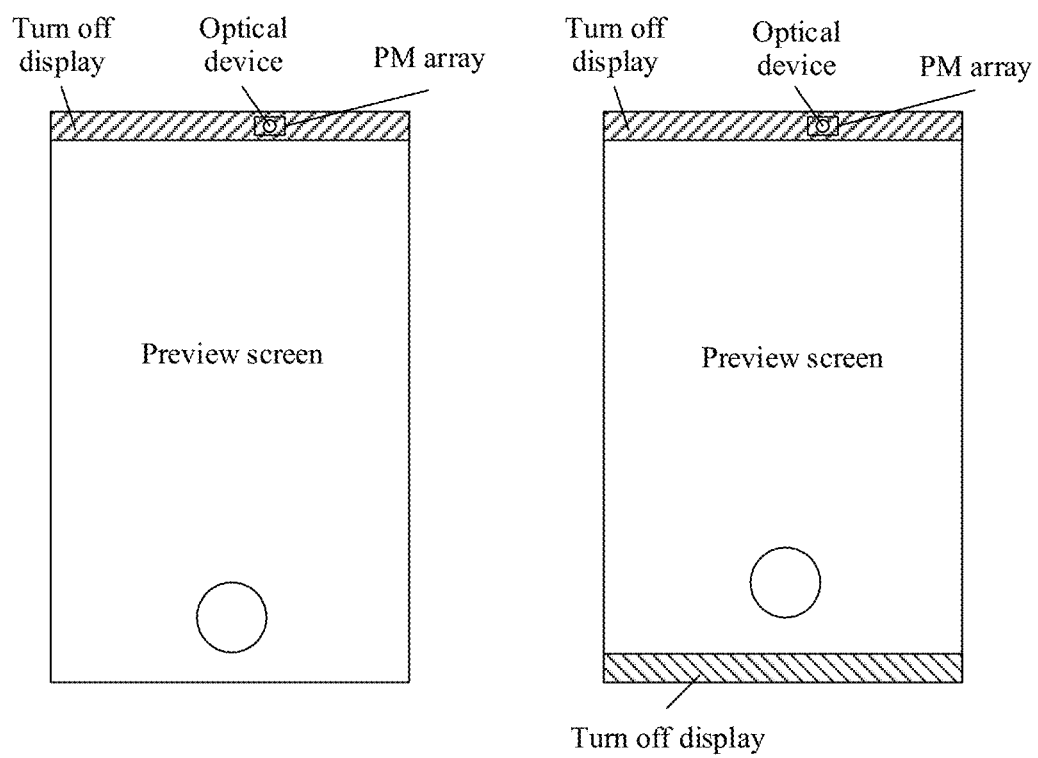
FIG. 4 is a schematic diagram of an electronic device in specific application according to an embodiment.

For example, referring to FIG. 4, when the front-facing camera is used to take a photo, on a photographing application interface, an entire rectangular region at the top (left figure in FIG. 4), or an entire rectangular region at the top and an entire rectangular region at the bottom (right figure in FIG. 4) may be turned off, and a remaining part is an entirety, to display information such as a preview window and operation buttons. In this way, a region in which PM pixels are turned off is displayed in black. The user visually considers that the region is not a part of the screen, and focuses on the displayed part that is considered as an entirety. Compared with a solution in which only PM pixels are turned off, this solution has stronger integrity in terms of interface display and provides better user experience (if only the PM pixels are turned off and surrounding AM pixels are not turned off, an effect similar to that of a "notch screen" in the prior art is caused, affecting the integrity and user experience).

It should be noted that such an operation of turning off the entire rectangular region is not limited to a case in which the optical device needs to be used, and a similar operation may also be performed, for example, on a video playing or game interface, to turn off a matrix region (a size may be customized based on a specific application scenario) in which the PM array is located. In this way, a remaining display region includes only the AM array. A display resolution of the AM array is higher, and this can provide better visual experience for the user.

In an embodiment, the PM array and the AM array may be further enabled to display different content on application interfaces based on characteristics of the PM array and the AM array. Generally, the PM array has a relatively low resolution, and a display effect of the PM array is not as good as that of the AM array. Therefore, content that has a relatively high requirement for the display effect is displayed by the AM array, and content that has a relatively low requirement for the display effect is displayed by the PM array. "Relatively low" and "relatively high" herein indicate a comparison between the "AM array" and the "PM array". For example, for a smartphone, when a desktop of the smartphone is displayed, a task bar at the top of the desktop has a relatively low requirement for the display effect (the task bar is mainly used to display several icons, and gains no special attention from the user), and therefore may be displayed by the PM array, and other content may be displayed by the AM array.

Embodiment 2

Based on the foregoing embodiment, this embodiment describes in detail specific implementation of the control circuit 13 when the first display array is the AMOLED array 11 and the second display array is the PMOLED array 12.

In an embodiment, a circuit is designed for the AM array and the PM array. In the circuit, independent pins are designed for rows and columns of the AM array and the PM array, to control the AM array and the PM array. In the prior art, a control circuit for controlling a display array (for example, an AM array) usually includes a driver IC chip. If a pin for controlling a PM array needs to be added, an existing driver IC chip for the AM array needs to be redesigned, to add the pin for controlling the PM array to the driver IC chip, or a driver IC chip for controlling the PM array needs to be independently designed. No matter which manner is used, costs (including design costs and hardware costs) and a volume are increased.

Figure 5:
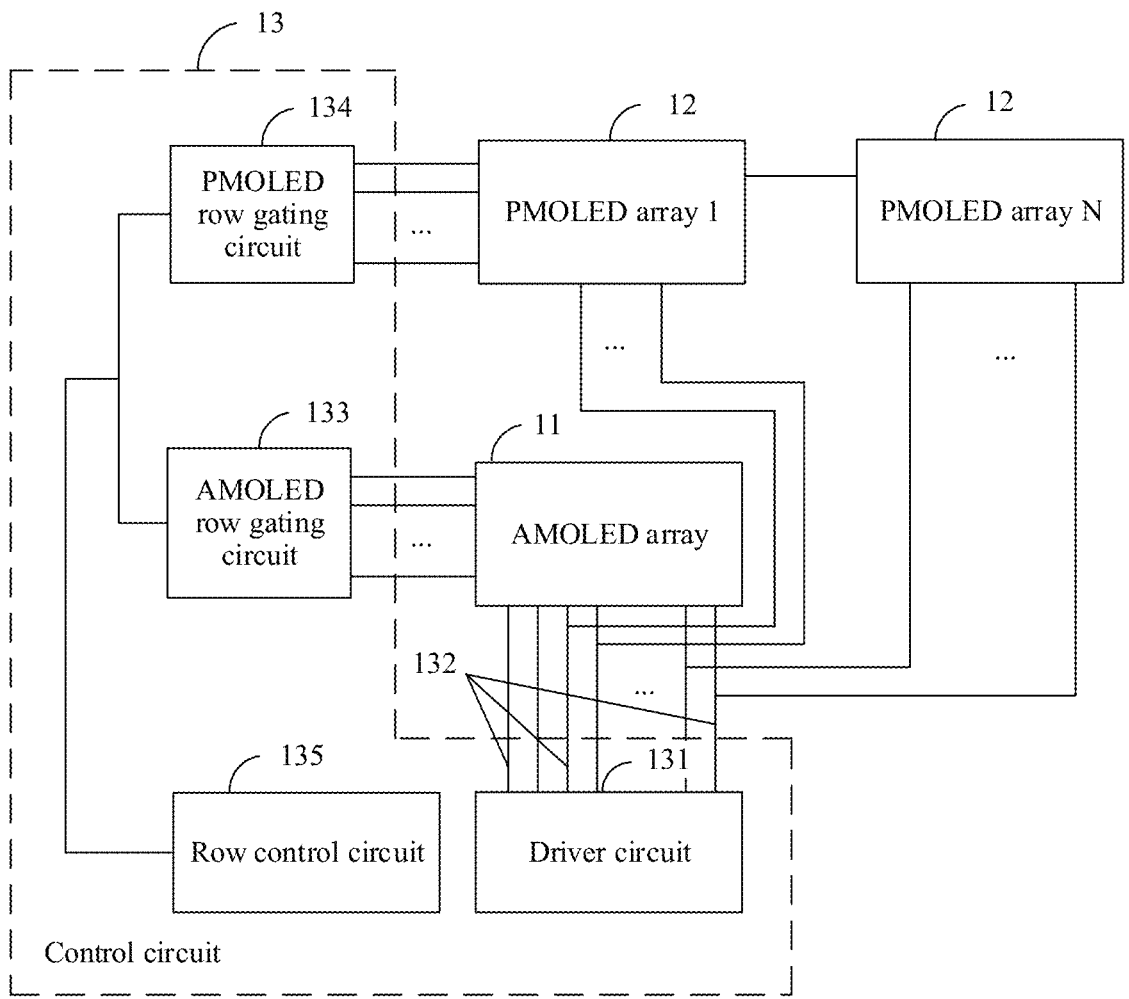
FIG. 5 is a schematic structural diagram of a display screen module according to another embodiment.

Referring to FIG. 5, in this embodiment, the control circuit provided in Embodiment 1 may include a driver circuit 131, a plurality of data pins 132 (also referred to as data lines), an AMOLED row gating circuit 133, a PMOLED row gating circuit 134, and a row control circuit 135, where the plurality of data pins are connected to the AMOLED array, and some data pins in the plurality of data pins are also connected to the PMOLED array.

The driver circuit is configured to drive the AMOLED array by using the plurality of data pins and drive the one or more PMOLED arrays by using the some data pins.

The row control circuit is configured to control the AMOLED row gating circuit and the PMOLED row gating circuit.

The AMOLED row gating circuit is configured to gate a row of the AMOLED array under control of the row control circuit.

The PMOLED row gating circuit is configured to gate a row of the one or more PM arrays under the control of the row control circuit.

In an embodiment, the plurality of data pins are pins configured to output data to drive the display array (for example, the AM array or the PM array), and may also be referred to as "driver pins". The data pins in this embodiment are shared, in other words, some pins are used for both the AM array and the PM array. This can minimize costs and a volume when a driver IC chip for the AM array is redesigned or a new driver IC chip is designed for the PM array.

In an embodiment, the one or more PM arrays may have an equal quantity of rows, and the one or more PM arrays share a row line. In this way, rows of all the PM arrays can be gated by using only one row gating signal. This can reduce design complexity and design costs.

Embodiment 3

Figure 6:
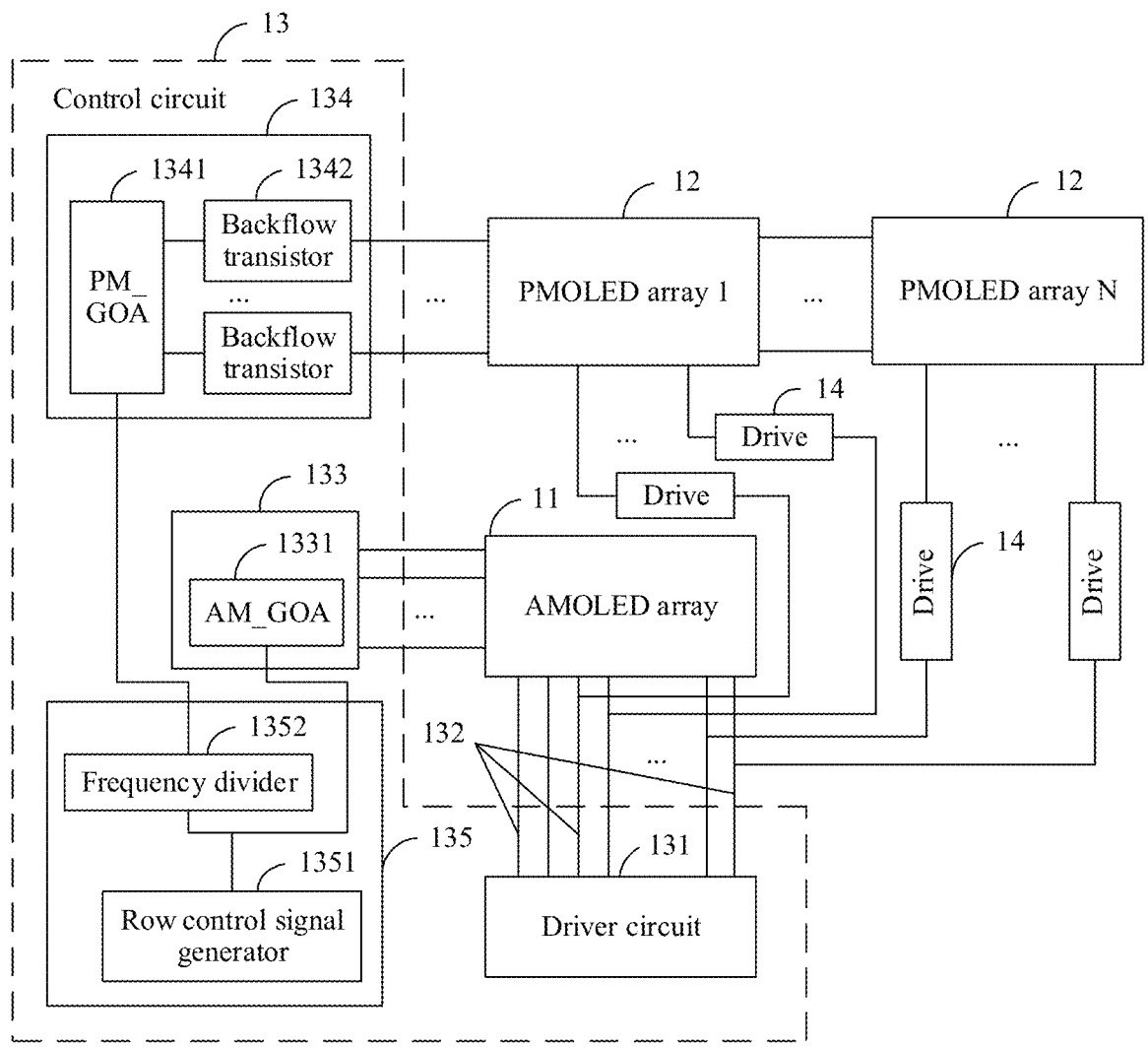
FIG. 6 is a schematic structural diagram of a display screen module according to another embodiment.

Based on Embodiment 2, this embodiment discloses a display screen module. Referring to FIG. 6, based on Embodiment 2, the display screen module further includes a plurality of PMOLED drives 14, where each of the plurality of PMOLED drives 14 is connected to one data pin 132 in the some data pins and one column in the one or more PMOLED arrays.

When being configured to drive the one or more PMOLED arrays by using the some data pins, the driver circuit is configured to drive the one or more PMOLED arrays by using the some data pins and the PMOLED drives.

In an embodiment, the drive is a device configured to drive the PM. A relatively large current is required to light up (namely, "drive") a PM pixel, but a relatively small current can be generated by an existing driver circuit. Therefore, a drive needs to be added, to drive a pixel in the PM array. For implementation of the drive, refer to the prior art. For example, the drive may be implemented by using a MOS transistor.

In an embodiment, the row control circuit 135 includes a row control signal generator 1351 and a frequency divider 1352, the row control signal generator is connected to one end of the frequency divider, and the other end of the frequency divider is connected to the PM row gating circuit. The row control signal generator is configured to output a clock signal CLKA to control the AM row gating circuit. The frequency divider is configured to perform frequency division on the clock signal CLKA output by the row control signal generator, to obtain a frequency-divided clock signal CLKB. The AM row gating circuit is configured to gate the row of the AM array under control of the clock signal. The PM row gating circuit is configured to gate the row of the one or more PM arrays under control of the frequency-divided clock signal.

This application relates to the AM array and the PM array. Therefore, both the AM array and the PM array need to be considered during scanning. For this reason, the frequency divider is introduced. Two types of clock signals in a specific proportion are generated by using the frequency divider, to respectively control the AM/PM row gating circuit. The following operations may be cyclically performed in sequence to scan the AM array and the PM array: outputting some clock cycles to scan the AM array, outputting one clock cycle to scan one row of the PM array, outputting some clock cycles to scan a remaining row of the AM array, and then outputting one clock cycle to scan a next row of the PM array. In other words, the AM array and the PM array are scanned in a time division manner. In another embodiment, the PM array may alternatively be scanned after the AM array is completely scanned.

In an embodiment, a specific frequency division method may be implemented based on the following method: It is assumed that the one or more PMOLED arrays have M rows, and the AMOLED array has N rows. A frequency division coefficient of the frequency divider is obtained by rounding N/M and then adding 1, where both N and M are integers greater than 2, and N is greater than M. The rounding herein may be rounding up or rounding down. It may be understood that, in actual application, the frequency division coefficient may alternatively be another value, provided that the AM array and the PM array can be scanned in a specific sequence.

In an embodiment, a row gating circuit may be implemented based on an existing GOA (gate of array, gate of array). A principle of the GOA is similar to that of a shift register. The GOA includes a plurality of output pins, and may enable, driven by a clock signal, a pin to be effective in sequence, to gate a row. A gate is usually driven. Therefore, the GOA may also be considered as a gate driver circuit. In this embodiment, for the AM array, an existing GOA 1331 for the AM array (AM_GOA for short below) may be still used for the AM row gating circuit. For the PM array, a GOA 1341 for the PM array (PM_GOA for short below) may be used for the PM row gating circuit.

In an embodiment, the AM array and the PM array share data pins. In addition, the clock signal generated by the row control signal generator is output to the GOAs of the two arrays. In this way, it is possible that the AM array and the PM array are gated at the same time. In this case, when data is output from a data pin, the data is originally intended to be output to only one display array (for example, the PM array), but actually, the data is also output to the other display array (for example, the AM array). As a result, a display error is caused.

To resolve this problem, in this embodiment, some dummy (dummy) pins, also referred to as invalid pins or empty pins, may be set in the AM_GOA. These pins are not connected to the AM array, and are used to prevent the PM array and the AM array from being gated at the same time. Specifically, a pin that is of the AM_GOA and that corresponds to an overlapped clock cycle in two clock signals respectively input into the AM_GOA and the PM_GOA may be set as a dummy pin.

Figure 7:
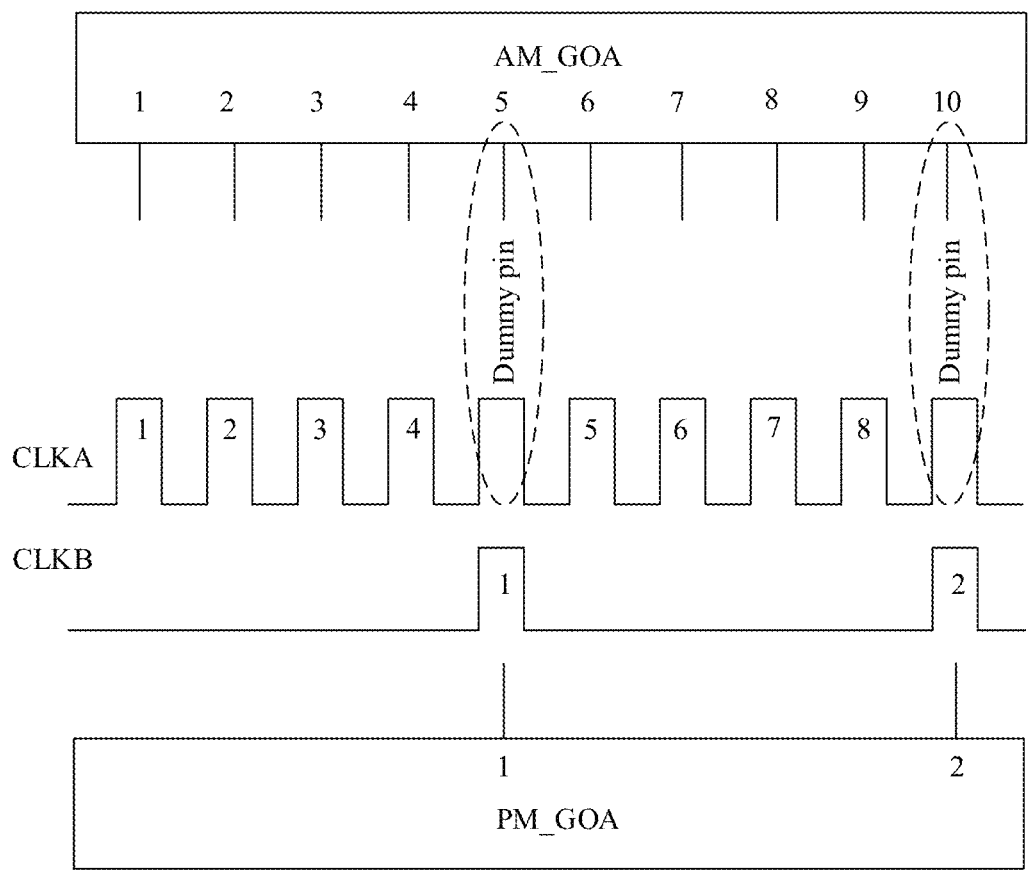
FIG. 7 shows a method for setting a dummy pin according to another embodiment.

For example, referring to FIG. 7, it is assumed that the frequency division coefficient is 5 (that is, when the CLKA input into the AM_GOA has five clock cycles, the CLKB input into the PM_GOA has one clock cycle), the AM array has eight rows in total, and the PM array has two rows. In this case, a quantity of output pins of the AM_GOA may be set to 10. In the figure, in the CLKA, a clock cycle marked with a number indicates that a corresponding row is gated in the clock cycle, and a clock cycle not marked with a number indicates that a gating signal in this case is output from a dummy pin and is not used for row gating. As shown in a timing diagram of the clock signals, after a clock cycle marked with 4 and a clock cycle marked with 8 in the CLKA, two clock signals respectively input into the AM_GOA and the PM_GOA overlap (that is, the two clock signals are valid). A clock cycle following the clock cycle marked with 4 in the CLKA corresponds to the 5th pin of the AM_GOA (that is, when the 5th CLKA clock signal comes, the AM_GOA outputs a valid signal at the $5^{th}$ pin to gate a row of the AM array). Therefore, the $5^{th}$ pin of the AM_GOA is set as a dummy pin. Similarly, the $10^{th}$ pin of the AM_GOA is also set as a dummy pin.

In addition, a dummy pin may be further set to supplement a quantity of rows of each GOA, to enable a quantity of rows of the AM_GOA to be rounded-N/M times that of the PM_GOA.

For example, it is assumed that the AMOLED array has 10 rows (N=10) and the PMOLED array has 3 rows (M=3). Correspondingly, the AM_GOA needs to have 10 valid output pins (respectively connected to 10 rows of AMOLED pixels), and the PM_GOA needs to have three valid output pins (respectively connected to three rows of PMOLED pixels). The following separately describes in detail how to set a dummy pin in the following two cases: The frequency division multiple is a value obtained by rounding up N/M and then adding 1, and the frequency division multiple is a value obtained by rounding down N/M and then adding 1.

Figure 8:
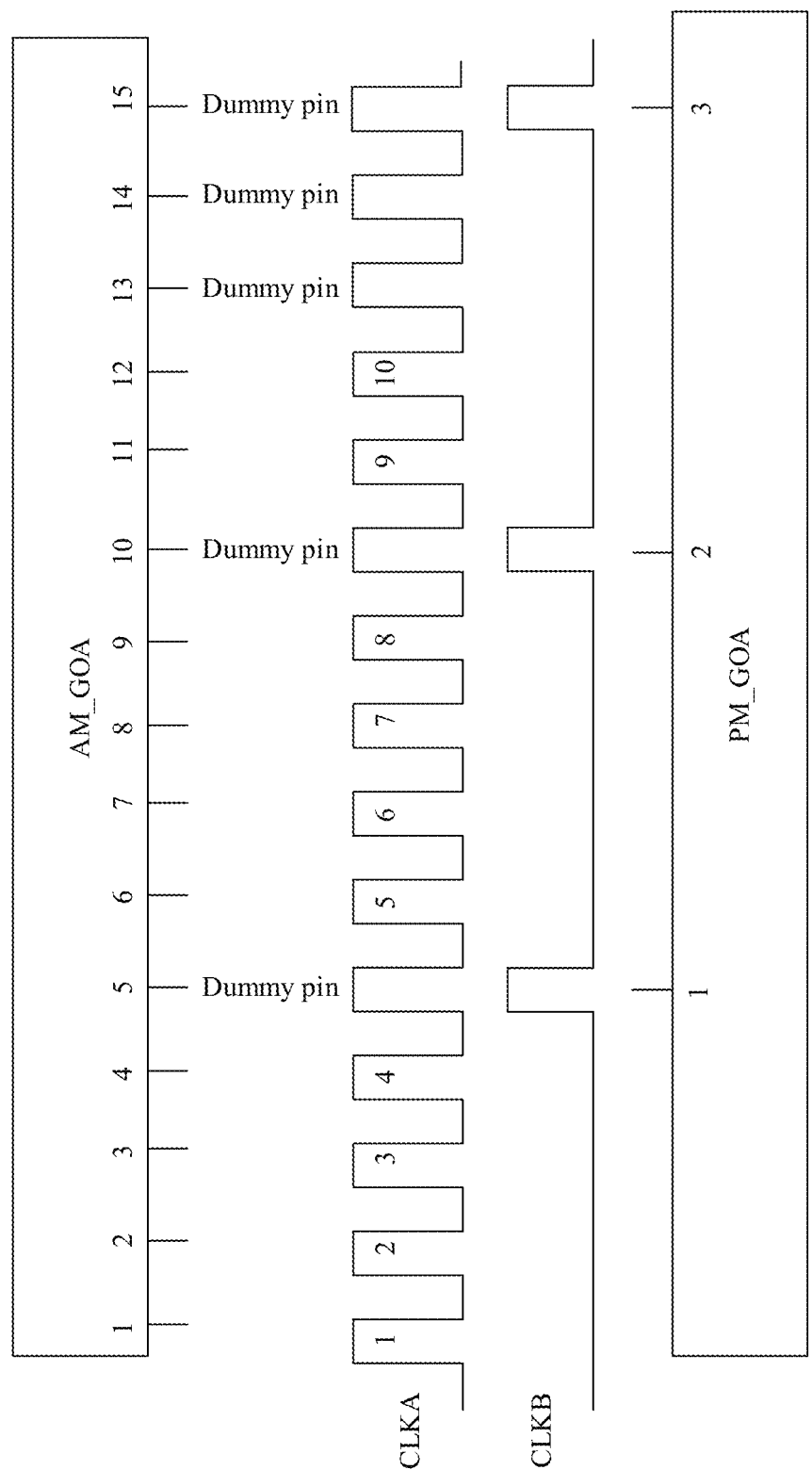
FIG. 8 shows another method for setting a dummy pin according to another embodiment.

FIG. 8 shows output of a clock signal and setting of a dummy pin of each GOA when the frequency division coefficient is a value (equal to 5) obtained by rounding up N/M (equal to 4) and then adding 1. As described above, in clock cycles marked with 1, 2, and 3 and output by the CLKB, the CLKA also has a valid clock signal. Therefore, to prevent the CLKA signal from being used to gate the AMOLED array, AM_GOA pins corresponding to the cycles are set as dummy pins (for example, pins 5, 10, and 15). In addition, to supplement the quantity of rows of each GOA to enable the quantity of rows of the AM_GOA to be rounded-N/M times that of the PM_GOA, pins 13, 14, and 15 of the AM_GOA are set as dummy pins.

Figure 9:
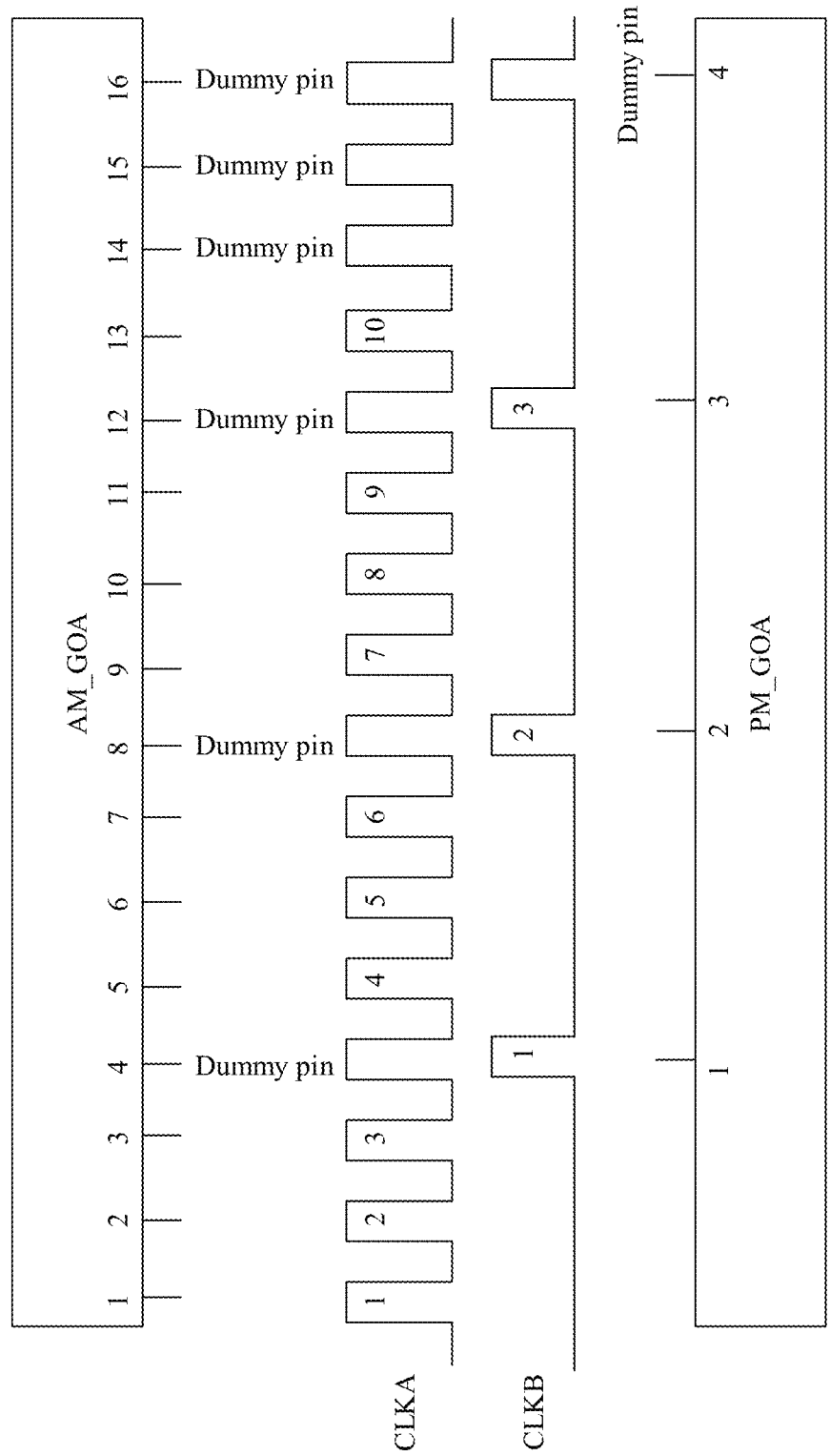
FIG. 9 shows another method for setting a dummy pin according to another embodiment.

Likewise, FIG. 9 shows output of a clock signal and setting of a dummy pin of each GOA when the frequency division coefficient is a value (equal to 4) obtained by rounding down N/M (equal to 3) and then adding 1. To avoid simultaneous gating, pins 4, 8, and 12 of the AM_GOA may be set as dummy pins. In addition, to supplement the quantity of rows of each GOA, pins 14, 15, and 16 of the AM_GOA and a pin 4 of the PM_GOA may be set as dummy pins.

Referring to FIG. 6, for the PM array, in addition to the PM_GOA 1341, the PM row gating circuit may further include a plurality of backflow transistors 1342. Each backflow transistor is configured to connect to one output pin of a PMOLED gate of array and one row line of the one or more PMOLED arrays. The PM_GOA is configured to output a PM row gating signal under the control of the frequency-divided clock signal. A backflow transistor connected to a gated row is configured to gate the to-be-gated row under control of the PM row gating signal.

The backflow transistor is mainly used to form a backflow path (that is, form a loop from the driver circuit to the ground) together with the circuit. For example, if the driver circuit outputs a high level to an anode of the PM pixel, a low level needs to be ensured for a cathode of the PM pixel, to form the backflow path. However, if a gating signal is at a high level when the GOA performs row selecting, if the high level is directly connected to the cathode of the PM pixel, no voltage difference is generated. Therefore, a device is needed to convert an output of the GOA into an output (for example, a low level) that can form backflow. In addition, the GOA gates an entire row, and there are a plurality of pixels. To form the backflow path, the backflow transistor is further required to have a required through-current capability, that is, be capable of bearing a current of a specific magnitude.

Specific implementation of the backflow transistor is not limited, provided that the backflow path may be formed for the pixels in the gated row. In addition, an attribute of the backflow transistor may be changed based on another circuit. For example, when the driver circuit outputs a low level and is connected to the cathode of the PM pixel, if a backflow transistor is needed, the backflow transistor is used to ensure a high level for the anode of the PM pixel when the anode is gated, to form backflow. In this case, because the GOA can output a high level, the backflow transistor may not be used. In an existing design, a GOA outputs a high level. Based on an output of a driver circuit, the GOA needs to be connected to a cathode of a PM pixel, and the cathode of the PM pixel is at a low level. Therefore, the GOA cannot be directly connected to the cathode of the PM pixel, and a backflow transistor needs to be used to covert the high level into the low level. In an embodiment, the backflow transistor is implemented based on a MOS transistor. A gate of the MOS transistor may be connected to an output pin of a GOA, a drain of the MOS transistor is connected to a cathode of a PM pixel, and a source of the MOS transistor is grounded. In this way, when the GOA outputs a high level, the MOS transistor is conducted, and the drain outputs a low level.

It may be understood that, in actual application, one or more of the components in the foregoing embodiments may be packaged together to form one or more independent modules. For example, the row control circuit, the driver circuit, the PM_GOA, and the backflow transistor may be packaged into one chip, and the AM_GOA and the AM array are packaged together (for example, packaged on a substrate). This is not limited in this embodiment. A person skilled in the art may select a proper packaging form based on actual application.

Embodiment 4

Based on the foregoing embodiments, this embodiment discloses a display screen module. The display screen module is specific to a terminal that has only one front-facing camera. Therefore, the display screen module may include only one PM array. The PM array is placed above the front-facing camera, in other words, the front-facing camera may be hidden under a screen. This can achieve a higher screen-to-body ratio.

Figure 10:
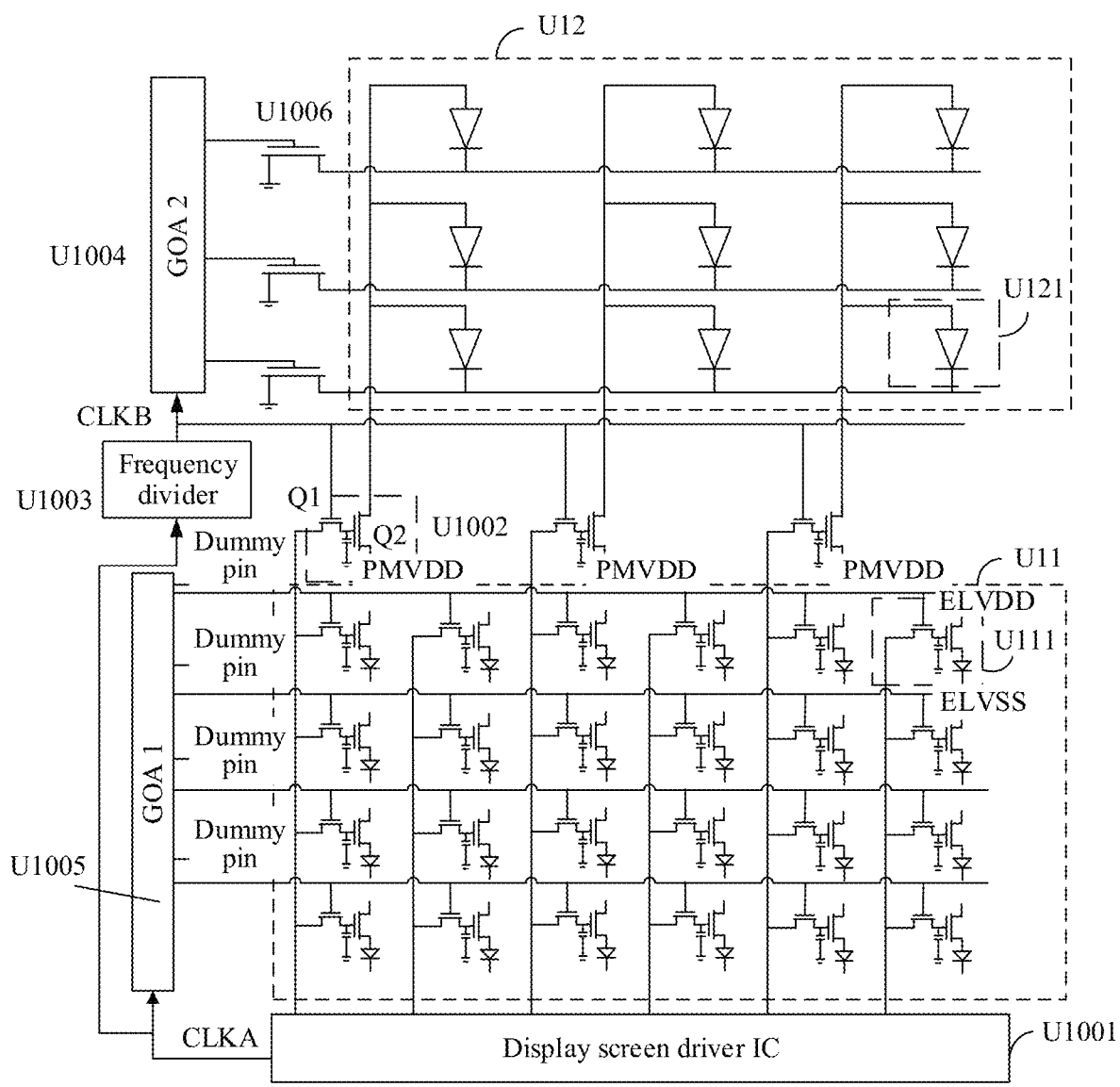
FIG. 10 is a schematic structural diagram of a display screen module according to another embodiment.

Specifically, referring to FIG. 10, the display screen module includes one PMOLED array (assuming that there are 50 rows and 300 columns) and one AMOLED array (assuming that there are 2000 rows and 1440 columns). The PMOLED array is configured to be placed above a front-facing camera of an electronic device, and an AMOLED screen is used in the remaining part, other than a part occupied by the PMOLED array, of the electronic device. Both the PM array and the AM array may be implemented based on the prior art. For example, the PM array and the AM array shown in FIG. 3 are used. In an embodiment, the display screen module further includes the following devices: a display screen driver IC (U1001), a plurality of PMOLED drives (U1002), a frequency divider (U1003), a GOA 2 (U1004), a GOA 1 (U1005), and a plurality of backflow transistors (U1006).

In an embodiment, the display screen driver IC is packaged as a chip (also referred to as a "driver IC" below). The IC drives a source of a MOS transistor, and therefore is also referred to as a source driver IC (source driver IC). In this embodiment, the display screen driver IC is an existing display screen driver IC (in a voltage-based driving manner) used for driving an AMOLED array. Using the existing IC can reduce design complexity, shorten a development cycle, and reduce costs. The display screen driver IC includes circuits such as the driver circuit, the data pin, and the row control signal generator in the row control circuit that are described in the foregoing embodiments. It should be noted that, in another implementation, the frequency divider, the GOA 2, and the backflow transistor may also be packaged into the display screen driver IC, to improve integration.

In an embodiment, a pin that is used to output a driving signal and that is of the driver IC is connected to each column of pixels in the AMOLED array (one pin is connected to one column, and different pins are connected to different columns, in other words, a plurality of pins are connected to a plurality of columns in the AMOLED array in a one-to-one correspondence manner). In addition, a pin of the driver IC is further "shared". In other words, in addition to being connected to a column of the AMOLED array, the pin is further connected to a column of the PMOLED array by using a PMOLED driver transistor (U1002). Specifically, each pin is connected to one column of the PMOLED array by using one driver transistor. Different pins are connected to different driver transistors and columns. In addition, the driver IC is further configured to: connect to a processor (for example, a Huawei Kirin processor or a Qualcomm Snapdragon processor in a mobile phone) (for example, connected by using a mobile industry processor interface Mobile Industry Processor Interface), and output corresponding data under control of the processor.

In an embodiment, each PMOLED drive (U1002) includes two TFT transistors, where a gating transistor Q1 (NMOS) is located on the left side of the figure, and a driver transistor Q2 (PMOS) is located on the right side of the figure. In addition, a capacitor C1 is further included. A drain of the Q1 is connected to the display screen driver IC, and is used to receive the driving signal output by the display screen driver IC. A gate of the Q1 is connected to an output pin of the frequency divider. A source of the Q1 is connected to one end of the capacitor and is connected to a gate of the Q2. A drain of the Q2 is connected to an anode of a PMOLED pixel. A source of the Q2 is connected to a high level (namely, a power supply represented by a PMVDD in the figure). The other end of the C1 is grounded. When the gate of the Q1 receives a high level, the Q1 is conducted. In this way, the driving signal output by the driver IC is connected to the gate of the Q2, to control a conduction degree of the Q2. In this way, the PMVDD can light up the PMOLED pixel and control brightness of the PMOLED pixel. The plurality of PMOLED drivers are respectively connected to a plurality of columns of the PMOLED array and pins of the driver IC, in other words, each pin is connected to only one PMOLED drive and one PMOLED column, and is not connected to another PMOLED driver or another PMOLED column. Likewise, each PMOLED drive is connected to only one pin and one PMOLED column, and each PMOLED column is connected to only one pin and one PMOLED drive. In addition, it may be understood that, for ease of implementation, the pins arranged in sequence in the driver IC and the columns arranged in sequence in the PMOLED array are sequentially connected in the one-to-one correspondence manner. For example, when a sequence of the pins in the driver IC is 1001 to 1050, and a sequence of the PMOLED columns is 1 to 50, a pin 1001 may be connected to a PMOLED column 1, a pin 1002 may be connected to a PMOLED column 2, and so on.

In an embodiment, the frequency divider (U1003) is configured to: perform 41 frequency division on a CLKA clock signal output by the driver IC, to obtain a clock signal CLKB, and send the clock signal CLKB to the GOA 2. This is because a quantity of AMOLED rows is 40 times that of PMOLED rows. A frequency division coefficient is obtained by adding 40 and 1, namely, is 41. The output clock signal CLKB of the 41 frequency divider U1003 is connected to both a gate of the PMOLED driver transistor (U1002) and a clock input end of the GOA 2 (U1004). The frequency divider and the GOA 1 (U1005) share the input clock signal CLKA provided by the driver IC.

In an embodiment, the GOA 2 (U1004) is configured to: scan the PMOLED array under control of the clock signal CLKB, and cooperate with the backflow transistor (U1006) to gate a row in the PMOLED array. Implementation of the GOA 2 is similar to implementation of the existing GOA 1, and details are not described herein again.

In an embodiment, the GOA 1 (U1005) is configured to: scan the AMOLED array under control of the CLKA clock signal, and gate a row in the AMOLED array. The GOA 1 may be a GOA 1 in an AMOLED array in the prior art, and no change is made to the GOA 1 in this application. A GOA (the GOA 1 or the GOA 2) is similar to a shift register. Based on a clock signal, the GOA outputs valid data on each output pin in sequence, to gate each row in sequence. For specific implementation of the GOA, refer to the prior art. Details are not described in this application. It should be noted that, in this embodiment, the AMOLED array and the PMOLED array are scanned in a time division manner by using the frequency divider. That is, the GOA 2 scans one row each time the GOA 1 scans 40 rows. However, when the 41th row is scanned, the CLKA clock signal is still input from the GOA 1. To avoid impact on AMOLED row gating, in this embodiment, an output pin in the 41th row in the GOA 1 is left idle and not connected to a load (namely, is not connected to a row in the AMOLED array), and is denoted as a dummy (dummy) pin in the figure. Similarly, same processing is subsequently performed every 40 rows. After the foregoing processing, the GOA 2 may scan one row each time the GOA 1 scans 40 rows. In other words, when all the 2000 rows in the AMOLED array are scanned, all the 50 rows in the PMOLED array are also scanned. In addition, in a clock cycle output by the GOA 2, output of the GOA 1 on the dummy pin does not affect AMOLED row gating.

In an embodiment, each backflow transistor (U1006) is one MOS transistor (NMOS). A drain of each backflow transistor is connected to cathodes of a row of PMOLED pixels, to perform a gating function. A gate of each backflow transistor is connected to one output pin output by the GOA 2 (U1004), and is used to receive a row scanning signal. A source of each backflow transistor is grounded. Each time the GOA 2 scans a row of the PMOLED array, a backflow transistor corresponding to the row is conducted. In this way, all cathodes of the row of PMOLED pixels in the PMOLED array are grounded, and this indicates that the row is gated at this time. In this case, if a driving signal is applied to a gated PMOLED pixel, the PMOLED pixel may be lit up.

Figure 11:
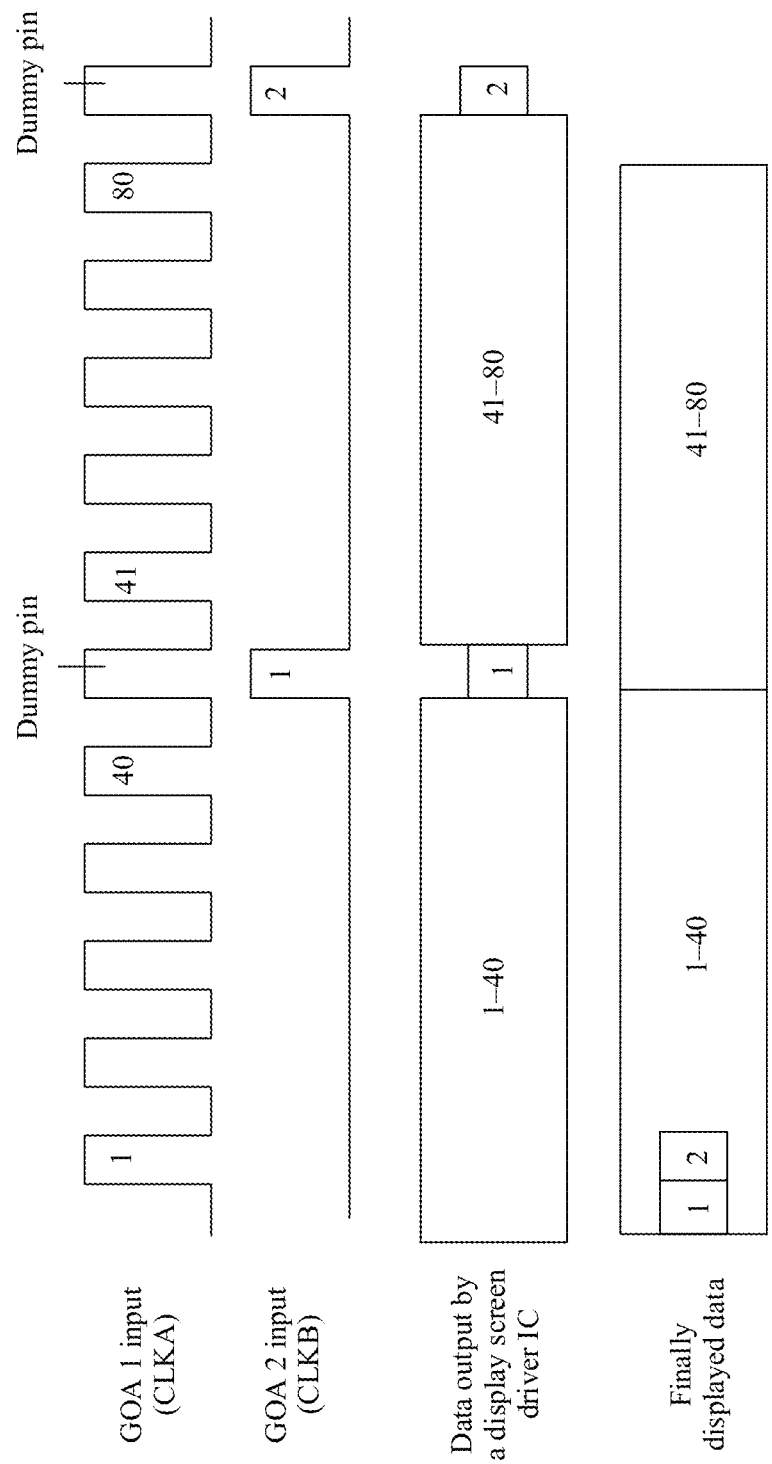
FIG. 11 is a signal timing diagram of a display screen module during working according to another embodiment.

Based on the foregoing specific structure, the following describes a specific scanning process with reference to a time-division scanning timing diagram shown in FIG. 11.

"Finally displayed data" in the $4^{th}$ row in FIG. 11 means displayed content that is actually seen on a display screen. That is, both the AMOLED array and the PMOLED array display corresponding content, where rectangular boxes marked with numbers 1 and 2 indicate content displayed by the PMOLED array, content indicated by numbers 1 to 40 and 41 to 80 is displayed by the AMOLED array. It should be noted that, for ease of description, FIG. 11 shows only some rows, and there may be more rows in actual application.

In FIG. 11, the $1^{st}$ row shows the input clock signal CLKA of the GOA 1, the $2^{nd}$ row shows the input clock signal CLKB of the GOA 2, and the $3^{rd}$ row shows data that is output by the driver IC in different clock cycles. For the clock signals shown in the two rows, a number marking a clock cycle indicates that the GOA 1 may gate a row represented by the number in this clock cycle. A "dummy pin" marking a clock cycle indicates that the GOA 1 outputs a valid signal on the dummy pin in this clock cycle, that no row in the AMOLED array is gated in this clock cycle, and that the clock cycle is used for scanning the PMOLED array, in other words, in this clock cycle, a row in the PMOLED is gated.

It can be learned from the figure that one clock pulse is input into the GOA 2 each time 41 clock pulses are input into the GOA 1. Among the 41 clock pulses, only 40 clock pulses are used to scan rows of the AMOLED array. Another pin is not connected, and therefore is denoted as a dummy pin in FIG. 11. The dummy pin is used to reserve a clock cycle for scanning the PMOLED array, and in this clock cycle, the AMOLED array is not scanned. In this case, when a shared pin on the driver IC is used to output data to the PMOLED array, the AMOLED array is not affected.

The $3^{rd}$ row in FIG. 11 indicates that the GOA 2 outputs one row of data (represented by small matrices marked with 1 and 2 in the figure) displayed by the PMOLED array each time the GOA 1 outputs 40 rows of data (represented by large rectangles marked with 1-40 and 41-80 in the figure) displayed by the AMOLED array.

Embodiment 5

Based on the foregoing embodiments, referring to FIG. 1, this embodiment discloses a terminal device, including a processor 20, a display screen module 10, and a memory 30. The processor 20 is connected to the display screen module and the memory 30, and the display screen module is the display screen module described in the foregoing embodiments. The processor is configured to control, by reading and executing a program instruction stored in the memory, the display screen module to display content.

Embodiment 6

Figure 12:
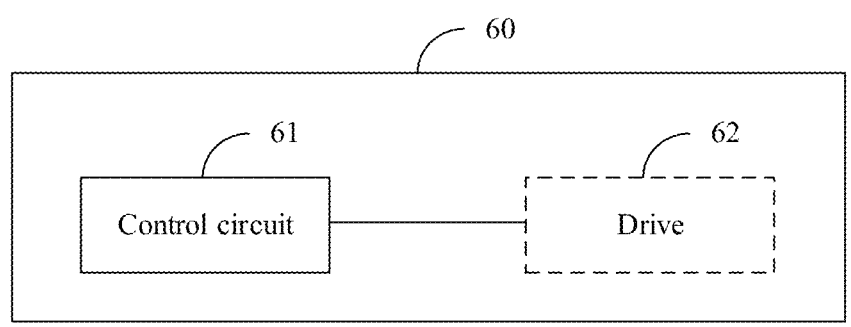
FIG. 12 is a schematic structural diagram of a control chip according to another embodiment.

Based on the foregoing embodiments, referring to FIG. 12, this embodiment discloses a display module control chip 60, including a control circuit 61 described in the foregoing embodiments, and may further include a drive 62 described in the foregoing embodiments. The chip may be configured to control the two types of display arrays described in the foregoing embodiments.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium may include: a magnetic disk, an optical disc, a read-only memory (Read-Only Memory, ROM), or a random access memory (Random Access Memory, RAM).

In the foregoing embodiments, the objective, technical solutions, and advantages of the present disclosure are further described in detail. The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A display screen device, comprising:
a first display array;
one or more second display arrays respectively corresponding to one or more groups of optical devices of an electronic device, and each second display array is located above a group of optical devices corresponding to the second display array, wherein each group of the optical devices comprises at least one optical device that needs ambient light during a normal operation;
a control circuit configured to
control each second display array to display an image when none of optical devices in a group of optical devices corresponding to the second display array operates normally,
when a target optical device in a group of target optical devices needs to operate, turn off some or all pixels of a target second display array corresponding to the group of target optical devices, so that the ambient light can penetrate the target second display array and enable the target optical device to operate normally, wherein the group of target optical devices is one of the one or more groups of optical devices, and the target second display array is one of the one or more second display arrays, and
when a predefined application interface is displayed, turn off a display region comprising all the second display arrays, so that a remaining display region is a complete rectangular display region, wherein the first display array is an active-matrix organic light-emitting diode (AMOLED) array, and the one or more second display arrays are one or more Passive-matrix organic light-emitting diode (PMOLED) arrays.

2. The display screen device according to claim 1, wherein the control circuit comprises:
a driver circuit to drive the AMOLED array using a plurality of data pins coupled to the AMOLED array and drive the one or more PMOLED arrays using at least a portion of the data pins coupled to the PMOLED arrays;
a row control circuit;
an AMOLED row gating circuit to gate a row of the AMOLED array under control of the row control circuit; and
a PMOLED row gating circuit to gate a row of the one or more PMOLED arrays under the control of the row control circuit.

3. The display screen device according to claim 2, further comprising a plurality of PMOLED drives, wherein each of the plurality of PMOLED drives is connected to a data pin in the at least a portion of the data pins and one column in the one or more PMOLED arrays; and
when being configured to drive the one or more PMOLED arrays using the at least a portion of the data pins, the driver circuit is configured to drive the one or more PMOLED arrays by using the at least a portion of the data pins and the PMOLED drives.

4. The display screen device according to claim 2, wherein the row control circuit comprises:
a row control signal generator to output a clock signal to control the AMOLED row gating circuit; and
a frequency divider to perform frequency division on the clock signal to obtain a frequency-divided clock signal, wherein the row control signal generator is connected to one end of the frequency divider, and the other end of the frequency divider is connected to the PMOLED row gating circuit
wherein the AMOLED row gating circuit is configured to gate the row of the AMOLED array based on the clock signal, and
wherein the PMOLED row gating circuit is configured to gate the row of the one or more PMOLED arrays based on the frequency-divided clock signal.

5. The display screen device according to claim 4, wherein the one or more PMOLED arrays comprise M rows, the AMOLED array comprises N rows, a frequency division coefficient of the frequency divider is obtained by rounding N/M and then adding 1, both N and M are integers greater than 2, and N is greater than M.

6. The display screen device according to claim 5, wherein the AMOLED row gating circuit comprises an AMOLED gate of array (GOA), the AMOLED GOA comprises a plurality of output pins, and an output pin corresponding to a PMOLED row gating clock cycle is set as a dummy pin that is not connected to the row of the AMOLED array.

7. The display screen device according to claim 5, wherein each PMOLED row gating circuit comprises a PMOLED gate of array (GOA), and the PMOLED GOA comprises a plurality of output pins; and the AMOLED GOA and one or more PMOLED GOAs comprise one or more dummy pins used for padding, so that a quantity of pins of the AMOLED GOA is [N/M] times a quantity of pins of the PMOLED GOA, wherein [ ] indicates a rounding operation.

8. The display screen device according to claim 4, wherein the PMOLED row gating circuit comprises the PMOLED gate of array and a plurality of backflow transistors, and each backflow transistor is configured to connect to one output pin of the PMOLED gate of array and one row line of the one or more PMOLED arrays;
the PMOLED gate of array is configured to output a PMOLED row gating signal under the control of the frequency-divided clock signal; and
the backflow transistor is configured to gate, under control of the PMOLED row gating signal, a row connected to the backflow transistor.

9. The display screen device according to claim 1, wherein the one or more PMOLED arrays comprise an equal quantity of rows, and the one or more PMOLED arrays share a row line.

10. The display screen device according to claim 1, wherein the optical device is located at a top of the electronic device in which the display screen device is located.

11. An electronic device, comprising:
a processor and a memory;
one or more groups of optical devices, each group of optical devices comprises at least one optical device that needs ambient light during a normal operation;
a display screen device comprising
a first display array,
one or more second display arrays respectively corresponding to the one or more groups of optical devices, and each second display array is located above a group of optical devices corresponding to the second display array, and a control circuit to control each second display array to display an image when none of optical devices in a group of optical devices corresponding to the second display array operates normally, when a target optical device in a group of target optical devices needs to operate, turn off some or all pixels of a target second display array corresponding to the group of target optical devices, so that the ambient light can penetrate the target second display array and enable the target optical device to operate normally, wherein the group of target optical devices is one of the one or more groups of optical devices, and the target second display array is one of the one or more second display arrays; and when a predefined application interface is displayed, turn off a display region comprising all the second display arrays, so that a remaining display region is a complete rectangular display region, wherein the first display array is an active-matrix organic light-emitting diode (AMOLED) array, and the one or more second display arrays are one or more Passive-matrix organic light-emitting diode (PMOLED) arrays.

12. The electronic device according to claim 11, wherein the control circuit comprises:

a driver circuit to drive the AMOLED array using a plurality of data pins connected to the AMOLED array and drive the one or more PMOLED arrays using at least a portion of the data pins; and a row control circuit to control the AMOLED row gating circuit and the PMOLED row gating circuit, wherein the AMOLED row gating circuit is configured to gate a row of the AMOLED array under control of the row control circuit; and wherein the PMOLED row gating circuit is configured to gate a row of the one or more PMOLED arrays under the control of the row control circuit.

13. The electronic device according to claim 12, further comprising a plurality of PMOLED drives, wherein each of the plurality of PMOLED drives is connected to one data pin in the at least a portion of the data pins and one column in the one or more PMOLED arrays; and when being configured to drive the one or more PMOLED arrays by using the at least a portion of the data pins, the driver circuit is configured to drive the one or more PMOLED arrays by using the at least a portion of the data pins and the PMOLED drives.

14. The electronic device according to claim 12, wherein the row control circuit comprises:

a row control signal generator to output a clock signal to control the AMOLED row gating circuit; and a frequency divider to perform frequency division on the clock signal to obtain a frequency-divided clock signal, wherein the row control signal generator is connected to one end of the frequency divider, and the other end of the frequency divider is connected to the PMOLED row gating circuit, wherein the AMOLED row gating circuit is configured to gate the row of the AMOLED array based on the clock signal, and wherein the PMOLED row gating circuit is configured to gate the row of the one or more PMOLED arrays based on the frequency-divided clock signal.

15. The electronic device according to claim 14, wherein the one or more PMOLED arrays comprise M rows, the AMOLED array comprises N rows, a frequency division coefficient of the frequency divider is obtained by rounding N/M and then adding 1, both N and M are integers greater than 2, and N is greater than M.

16. The electronic device according to claim 15, wherein the AMOLED row gating circuit comprises an AMOLED gate of array (GOA), the AMOLED gate of array comprises a plurality of output pins, and an output pin corresponding to a PMOLED row gating clock cycle is set as a dummy pin that is not connected to the row of the AMOLED array.

17. The electronic device according to claim 15, wherein each PMOLED row gating circuit comprises a PMOLED gate of array (GOA), and the PMOLED gate of array comprises a plurality of output pins; and the AMOLED gate of array and one or more PMOLED gates of array comprise one or more dummy pins used for padding, so that a quantity of pins of the AMOLED gate of array is [N/M] times a quantity of pins of the PMOLED gate of array, wherein [ ] indicates a rounding operation.

18. The electronic device according to claim 11, wherein the one or more PMOLED arrays include an equal quantity of rows, and the one or more PMOLED arrays share a row line.

* * * * *